US012597321B1

(12) United States Patent
Edmond et al.

(10) Patent No.: US 12,597,321 B1
(45) Date of Patent: Apr. 7, 2026

(54) SHOT CLOCK BETTING

(71) Applicant: Majaluk LLC, Oakland, CA (US)

(72) Inventors: James Edmond, Walnut Creek, CA (US); Ceasar Anthony Davis, Covington, GA (US)

(73) Assignee: Majaluk LLC, Oakland, CA (US)

( * ) Notice: Subject to any disclaimer, the term of this patent is extended or adjusted under 35 U.S.C. 154(b) by 0 days.

(21) Appl. No.: 19/249,336

(22) Filed: Jun. 25, 2025

Related U.S. Application Data

(60) Provisional application No. 63/728,863, filed on Dec. 6, 2024.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3288* (2013.01); *G07F 17/3211* (2013.01); *G07F 17/3237* (2013.01); *G07F 17/3244* (2013.01); *G07F 17/3262* (2013.01)

(58) Field of Classification Search
CPC ... G07F 17/32; G07F 17/3214; G07F 17/3222
USPC .............................. 463/1, 20, 22, 25, 30, 39
See application file for complete search history.

(56) References Cited

U.S. PATENT DOCUMENTS

| | | | | |
|---|---|---|---|---|
| 2012/0046109 | A1 | 2/2012 | Shore et al. | |
| 2016/0358406 | A1 | 12/2016 | Daly | |
| 2021/0150847 | A1* | 5/2021 | Salivar | G07F 17/3223 |
| 2022/0072419 | A1* | 3/2022 | Casassovici | H04N 21/2407 |
| 2022/0086511 | A1* | 3/2022 | Laakkonen | G07F 17/3225 |
| 2022/0092912 | A1 | 3/2022 | Huke et al. | |
| 2022/0108589 | A1* | 4/2022 | Choung | G07F 17/3267 |
| 2022/0406146 | A1 | 12/2022 | Hall et al. | |
| 2024/0062630 | A1 | 2/2024 | Nelson et al. | |

OTHER PUBLICATIONS

Genius Sports Group. "BetVision," https://www.geniussports.com/bet/bet-vision/, Accessed Jun. 26, 2025.

(Continued)

*Primary Examiner* — Adetokunbo O Torimiro
(74) *Attorney, Agent, or Firm* — Fox Rothschild LLP

(57) ABSTRACT

A method for accepting wagers during a live-streamed event includes receiving a data stream including time-stamped occurrences related to the event. The method further includes processing the data stream to determine an amount of time lag and determining whether a degree of synchronicity between the data stream and the event satisfies a threshold. The method further includes, in response to the synchronicity satisfying the threshold, augmenting a video stream of the event. Augmenting the video stream includes identifying that one of the time-stamped occurrences corresponds to a wagering opportunity, causing a user electronic device to overlay, on the video stream, an indication of the identified occurrence, and causing the user electronic device to output a user-selectable prompt for a limited period of time. The method further includes, if a wager request is received during the limited period of time, accepting the request, otherwise declining the request.

15 Claims, 4 Drawing Sheets

(56) References Cited

OTHER PUBLICATIONS

Arevalo, E., "Betting excitement: The power of livestreaming for your bets," Sportsbet.io, Jan. 25, 2024, https://sportsbet.io/blog/clubhouse/live-streaming-benefits-when-betting, Accessed Jun. 26, 2025.

Bayslope. Patentability Search Report, Apr. 10, 2025, 34 pages.

* cited by examiner

SHOT CLOCK BETTING

CROSS-REFERENCE TO RELATED APPLICATIONS

This application claims the benefit of U.S. Provisional Application No. 63/728,863, filed on Dec. 6, 2024, titled "Shot Clock Betting."

BACKGROUND

Online gambling is a kind of gambling conducted on the internet. Computer-based gambling has allowed new modes of gambling, just as video lottery terminals, keno, and scratchcards changed the gambling industry in the 20th century. In-play betting (also termed "live," "live action," or "in-the-run" betting) allows bets to be wagered after an event, such as a race or sporting match, has commenced. In-play betting is becoming increasingly popular. However, the ability to take full advantage of in-play betting requires precise synchronization between the computer-based gambling system and activities occurring during the event. This document describes methods and systems that address issues such as those discussed above, and/or other issues.

SUMMARY

The present disclosure describes embodiments related to accepting wagers during a live-streamed event. In an embodiment, a method includes receiving a data stream that includes a series of time-stamped occurrences related to a live event. The method further includes processing the data stream to determine an amount of data-stream time lag between the data stream and the live event. The method further includes determining, based on the amount of data-stream time lag, whether a degree of synchronicity between the data stream and the live event satisfies a threshold. In response to the degree of synchronicity satisfying the threshold, the method includes augmenting a video stream of the live event. Augmenting the video stream of the live event includes identifying, in the data stream, that one of the time-stamped occurrences corresponds to a wagering opportunity, causing a user electronic device that is displaying the video stream to overlay, on the video stream, an indication of the identified occurrence that is associated with the wagering opportunity, and causing the user electronic device to output a user-selectable prompt associated with the wagering opportunity for a limited period of time. The method further includes, in response to receiving a wager request via a user activation of the user-selectable prompt, if the wager request is received during the limited period of time, accepting the wager request, otherwise declining the wager request.

Implementations of the disclosure may include one or more of the following optional features. In some examples, analyzing the data stream to determine the amount of data-stream time lag includes comparing a timestamp of an occurrence of the series of time-stamped occurrences to a local time source. The method may further include analyzing the video stream to determine an amount of video-stream time lag, wherein determining whether the degree of synchronicity satisfies the threshold is further based on the amount of video-stream time lag. Analyzing the video stream to determine the amount of video-stream time lag may include comparing a timestamp of the video stream to a local time source. The method may further include receiving location information associated with the received wager and, in response to the location information being outside of a geofence, declining the wager. In some examples, identifying that one of the time-stamped occurrences corresponds to the wagering opportunity includes identifying a change of possession from one team to another team. Augmenting the video stream may include overlaying an indication of remaining time of the limited period of time. Augmenting the video stream may include overlaying names of all active players in the event. Causing the user electronic device to output a user-selectable prompt associated with the wagering opportunity may include overlaying controls allowing a player to establish or modify a monetary amount for a wager. Causing the user electronic device to output a user-selectable prompt associated with the wagering opportunity may include offering a choice of wagers, each wager including a defined set of conditions. Causing the user electronic device to output a user-selectable prompt associated with the wagering opportunity may include outputting a prompt to wager that a specific player will subsequently perform a particular play causing a score of the event to change. After accepting the wager, the method may include analyzing the video stream to determine whether conditions of the wager have been satisfied. Analyzing the video stream may include applying image recognition to the video stream to identify at least one condition of the wager.

In an embodiment, a system includes one or more processors; and a computer-readable memory containing programming instructions. The containing programming instructions are configured to, when executed, cause the one or more processors to receive a data stream including a series of time-stamped occurrences related to a live event. The programming instructions are further configured to cause the processor to process the data stream to determine an amount of data-stream time lag between the data stream and the live event. The programming instructions are further configured to cause the processor to determine, based on the amount of data-stream time lag, whether a degree of synchronicity between the data stream and the live event satisfies a threshold. The programming instructions are further configured to, in response to the degree of synchronicity satisfying the threshold, augment a video stream of the live event. The programming instructions are configured to augment the video stream by identifying, in the data stream, that one of the time-stamped occurrences corresponds to a wagering opportunity, causing a user electronic device that is displaying the video stream to overlay, on the video stream, an indication of the identified occurrence that is associated with the wagering opportunity, and causing the user electronic device to output a user-selectable prompt associated with the wagering opportunity for a limited period of time. The programming instructions are further configured to, if the wager request is received during the limited period of time, accept the wager request, otherwise decline the wager request.

Implementations of the disclosure may include one or more of the following optional features. In some examples, the programming instructions that are configured to cause the one or more processors to analyze the data stream to determine the amount of data-stream time lag include programming instructions that are configured to cause the one or more processors to compare a timestamp of an occurrence of the series of time-stamped occurrences to a local time source. The programming instructions may be further configured to cause the one or more processors to analyze the video stream to determine an amount of video-stream time lag. The programming instructions may be further configured to determine whether the degree of synchronicity between the data stream and the live event satisfies the threshold based on the amount of video-stream time lag. In some examples, the programming instructions that are configured to cause the one or more processors to augment the video stream include programming instructions that are configured to overlay an indication of remaining time of the limited period of time. The programming instructions may be further configured to cause the one or more processors to, after accepting the wager, analyze the video stream to determine whether conditions of the wager have been satisfied. In some examples, the programming instructions that are configured to cause the one or more processors to analyze the video stream to determine whether conditions of the wager have been satisfied include programming instructions that are configured to apply image recognition to the video stream to identify at least one condition of the wager.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
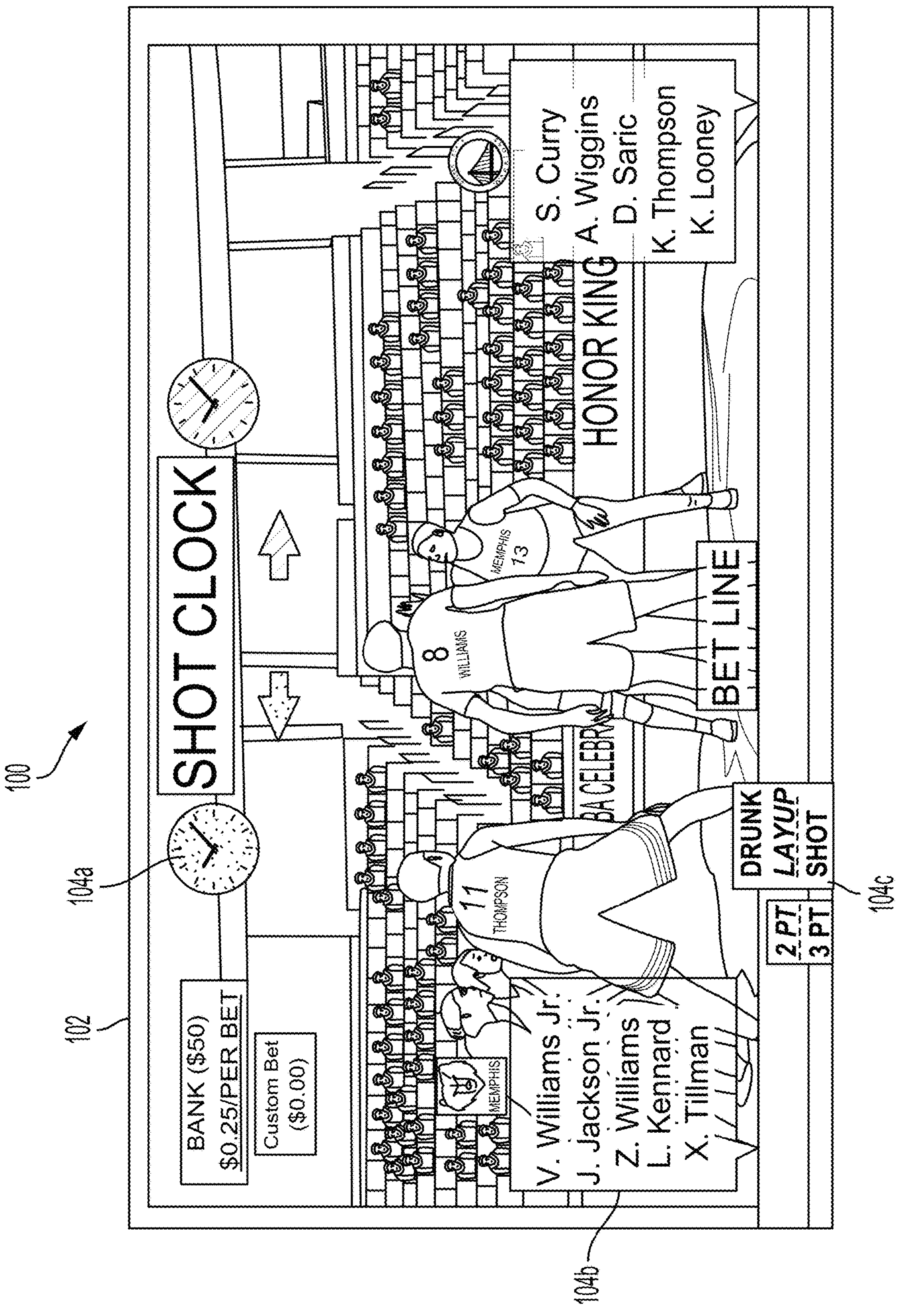
FIG. 1 shows an example live-streamed wagering environment.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such as "first" and "second" are used to modify a noun or phrase, such use is simply intended to distinguish one item from another and is not intended to require a sequential order unless specifically stated. The term "about" when used in connection with a numeric value, is intended to include values that are close to, but not exactly, the number. For example, in some embodiments, the term "about" may include values that are within +/−10 percent of the value.

The present disclosure relates generally to methods and systems of accepting wagers during a live-streamed event. One of the novel features includes identifying—in real, or near-real time, emerging (and limited-time) wagering opportunities. That is, the conditions for the wagering opportunity only arise due to specific events unfolding in specific (and often unpredictable) sequences of occurrences within the event, rather than the normal order of events expected for the event. For example, in the context of a baseball game, previous systems may have offered the opportunity to wager on, e.g., the number of runs scored in a particular inning (e.g., the fourth inning). However, because baseball games always have a fourth inning, such a wager could be placed before the game even begins. That is, the opportunity to place a wager on the number of runs scored during the fourth inning is independent of, and does not depend on, occurrences within the baseball game. In contrast, the wagering opportunities described in this document may arise spontaneously and unpredictably throughout the event.

Furthermore, the present disclosure relates to limited-time wagering opportunities. That is, once the system identifies the wagering opportunity and prompts the user to place a wager, the system enforces a limited period of time for the user to place the wager. The effect of the limited time is to increase user engagement. That is, because wagering opportunities arise spontaneously and unpredictably, and because the user must place a wager within a limited period of time, and because the result that the user wagers on may depend on subsequent occurrences within the event, the user is incentivized to carefully monitor and scrutinize occurrences within the event to gauge the likelihood of future occurrences. For example, if the wagering opportunity is triggered by a change of possession within a sporting event, and the wager is based on whether the possessing team will score before losing possession, the user may be incentivized to monitor how likely each team (or individual) is to score after a possession change.

An additional feature is that the outcome of the wagering opportunity may be determined and/calculated before the end of the entire event. That is, not only may the system only present the wagering opportunity for a limited period of time, but the outcome itself may occur within a relatively short period of time (e.g., compared to the total duration of the event). Therefore, many such wagering opportunities may arise throughout the event, and at unpredictable times. And because the outcome may be determined during the event, e.g., in real-time (or near real-time), in a similar manner to how the wagering opportunities are identified, rewards (e.g., payouts) may be distributed throughout the event, not only at the end. Thus, the disclosed methods and systems provide a dynamic, fast paced, environment, with wagering opportunities arising unpredictably, thus increasing the excitement of viewing the event in ways that previous systems cannot match.

In particular, the disclosure relates to synchronizing a computer-based wagering system with activities occurring during the event. The event may be a sporting event, such as a football, basketball, soccer, baseball or other professional or amateur competition between individuals or teams. The event may also include individual efforts, such as a race along or over a course by, e.g., a person, machine, animal, or any combination of person, machine, or animal. The event can also include other activities that are amenable to wagering, i.e., including circumstances in which one or more outcomes are not known in advance but which can be reliably determined to have occurred (or not).

FIG. 1 shows an example live-streamed wagering environment 100. The example event is a professional basketball game. The example environment includes a video display 102 of the event. That is, the environment 100 includes an electronic device with a display that displays a video representation of the event in real time or near real time. Event promoters may arrange for video cameras to capture the event as it occurs and provide the captured video stream (e.g., 202, FIGS. 2A, 2B) over a network for display. In some examples, a computer-based wagering system (e.g., 210*a*, 210*b*, FIGS. 2A, 2B) receives the video stream 202, augments the video stream (as described in more detail below), and causes the electronic device to display the augmented video stream. In other examples, the computer-based wagering system 210 outputs an overlay 208 (also known as a "skin") which then can be applied to the video stream 202. In these (and other) configurations, the user views the video display 102 of the event augmented by one or more features 104 that overlay the video display 102. As shown in FIG. 1, these features 104*a-c* include a countdown timer 104*a* (also known as a "shot clock"), a list of active players 104*b* on each team at any point in time, a display of available wagering opportunities 104*c*, and so forth. The computer-based wagering system synthesizes these features based on aspects of the event, such as activities occurring during the event. That is, the computer-based wagering system 210 may monitor the event for salient actions or occurrences and update the overlays accordingly. For example, when one player is substituted for another, the computer-based wagering system 210 may update the list of active players. And when the computer-based wagering system 210 determines that circumstances allow for a limited-time wagering opportunity, the computer-based wagering system 210 may synthesize one or more features alerting a viewer of the wagering opportunity and prompting the user to input a wager selection.

Figure 2A:
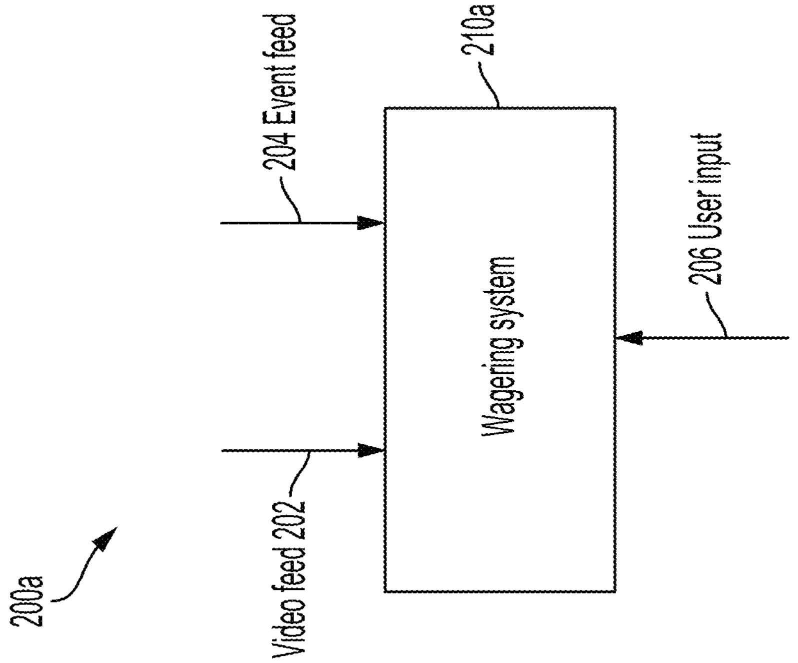
FIGS. 2A and 2B shows a diagram of elements of a computer-based wagering system.
Figure 2B:
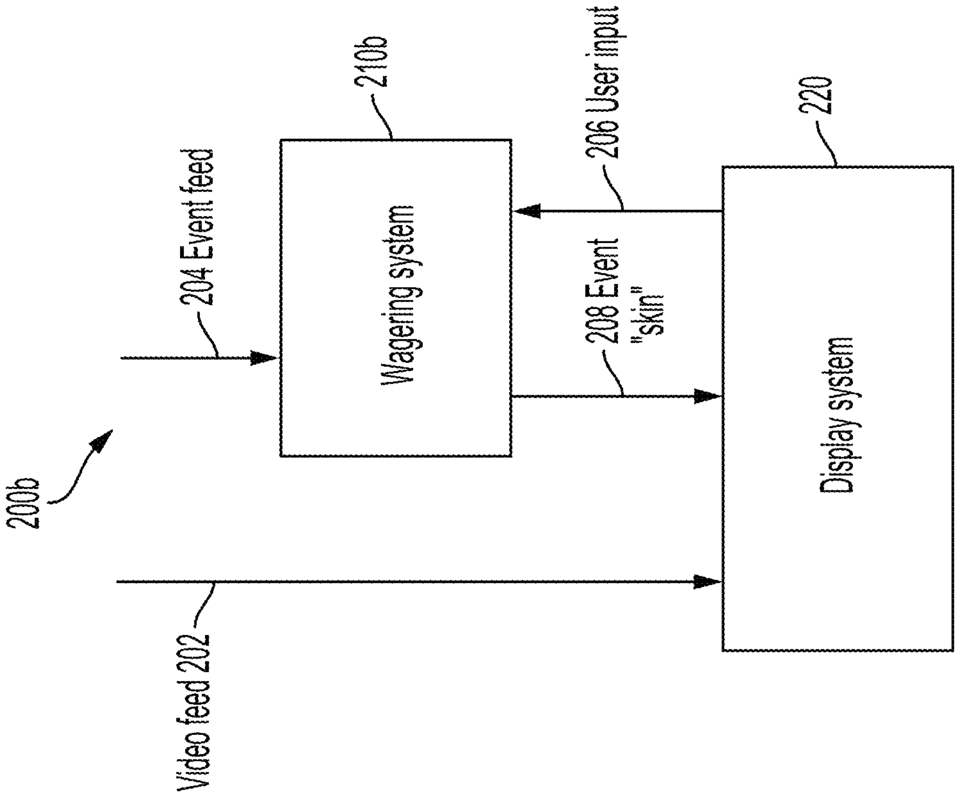

FIGS. 2A and 2B show two embodiments of arrangements 200*a*, 200*b* of elements of a live-streamed wagering environment 100. Referring to FIG. 2A, a computer-based wagering system 210*a* receives a video feed 202 of the event. That is, the computer-based wagering system 210*a* receives a stream 202 of the captured video of the event, e.g., from an authorized source, such as promoters of the event. The computer-based wagering system 210*a* also receives one or more event feeds 204. That is, the system 210*a* may receive a sequence of occurrences related to the event. In some examples, the event feed includes time-stamped indications of salient aspects of the event, e.g., as provided by the event promoter or other trustworthy source(s). For the example of a competition between teams, the salient aspects may include which team and/or player is in possession of the ball/puck (or who is the current batter/batsman); points/goals/runs or other accomplishments of a team/player; fouls/penalties assessed against a team/player; remaining time in the game (or a period of the game); and so forth. The computer-based wagering system 210*a* may also analyze the video feed 202 for additional aspects related to the event and/or to verify the contents of the event stream. In some examples, the computer-based wagering system 210*a* applies image-recognition algorithms to identify specific occurrences that may be related to wagering opportunities. For example, the computer-based wagering system 210*a* may include machine-learning models that are trained to identify when a sports teams scores points/goals/runs. The machine-learning models may also be trained to identify plays performed by a sports team (e.g., plays that result in a score increase). As described above, the computer-based wagering system 210*a* monitors the event feed 204 and uses the information to synthesize overlays for the video feed 202. The computer-based wagering system 210*a* may then display the combination of the video feed 202 and the overlays to a viewer. As described above, the overlays may include prompts for the user to place a wager. The computer-based wagering system 210*a* also receives user input 206, such as responses to one or more prompts. The prompts may, e.g., offer the user a choice of wagers to select from. The wagering system 210*a* may process the received user input 206 to determine whether the user has placed a wager, the terms of the wager, and so forth. Furthermore, the wagering system 210*a* may receive user input related to the video display 102. For example, the user may pause, rewind, and/or fast-forward the video display 102, e.g., to get a better view of a play. The wagering system 210*a* processes these inputs and may also suppress wager-related overlays during periods of time when the video display 102 does not represent the live video feed 202.

In some examples, the video feed 202 also serves as an event feed 204. That is, the wagering system 210*a* performs image recognition on the video feed 202 to determine the sequence of occurrences (e.g., salient aspects) related to the event. In some examples, the video feed 202 includes timestamps that the wagering system 210*a* uses to determine an amount of time lag, e.g., by comparing the timestamp to a local time source.

FIG. 2B shows an alternative arrangement 200*b* of elements of a live-streamed wagering environment 100. The chief difference with respect to FIG. 2A is that the wagering system 210*b* does not receive the video feed 202. Instead, the video feed 202 is received by a separate electronic device that includes a display system 220 which is configured to combine the video feed 202 with a "skin" 208 that the wagering system 210*b* outputs. Otherwise, the processing performed by the wagering system 210 in either arrangement 200*a*, 200*b* is substantially similar. As described with respect to FIG. 2A, the "skin" includes features that the wagering system 210*b* synthesizes based on the event feed 204. In the arrangement 200*b* of FIG. 2B, the display system 220 relays user input 206 to the wagering system 210*b* for processing. By processing the user input 206, the wagering system 210*b* is able to ensure the fidelity of the wagers and approve wagers that satisfy criteria of the wagering system 210*b*. These criteria may include placing the wager within a defined (and limited-duration) time window, access to sufficient user funds to satisfy a payment, applicable geofencing requirements, and so forth. For example, the wagering system 210*b* may determine, using geofencing, whether the user is located within (or outside) a jurisdiction that permits online betting. The wagering system 210*b* may also determine whether the user is physically present at the event, e.g., within a sporting arena, or even whether the user is in a designated seat of the sporting arena, or in a designated wagering room at the event.

The wagering system 210 may also process the event feed 204 to determine an amount of communication lag or latency in the event feed 204. For example, the wagering system 210 may compare time stamps of occurrences in the event feed 204 against a source of accurate time, such as a real-time clock or other local time source associated with the wagering system 210. The source of accurate time may also be a trustworthy external source, such as a Global Positioning System (GPS) or a clock signal of a communication network, such as a wireless telephony system. The wagering system 210 may also use these external time sources to calibrate and/or synchronize a local time source. The wagering system 210 may inhibit synthesizing overlay features 104 for the video display 102 when the latency exceeds a threshold. For example, the wagering system 210 may suppress prompting the viewer to place a wager when the latency exceeds the threshold. In some examples, the wagering system 210 instead overlays the video display 102 with an indication that the event feed latency is too great.

Figure 3:
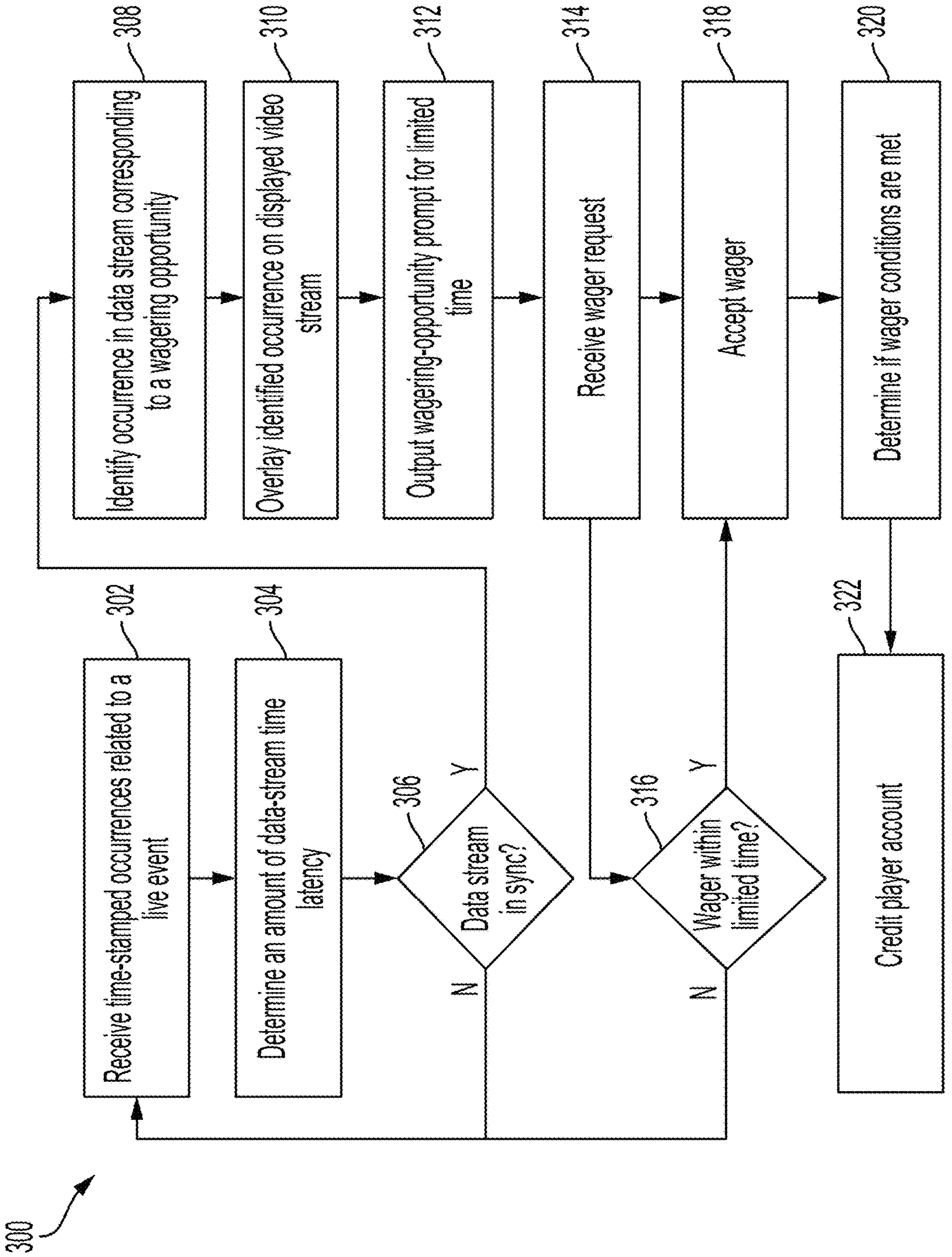
FIG. 3 shows a flowchart of an example method.

FIG. 3 shows a flowchart 300 for an example method of accepting wagers during a live-streamed event. At step 302, the method includes receiving a data stream including a series of time-stamped occurrences related to a live event. This event-data stream may originate from a promoter of the event or other trustworthy source of information regarding salient activities occurring in the event. At step 304, the method includes processing the data stream (e.g., event feed 204) to determine an amount of data-stream time lag between the data stream and the live event. In some examples, analyzing the data stream (e.g., event feed 204) includes comparing timestamps of occurrences with a trustworthy real-time clock. In other examples, analyzing the data stream includes analyzing an associated video stream 202 to detect when the occurrences took place, and comparing timing information between the event stream (e.g., event feed 204) and the video stream 202. For example, the method may include applying image recognition to frames of the video stream to detect one or more occurrences and may correlate the occurrence with timing information embedded in the video stream 202.

At step 306, the method includes determining, based on the amount of data-stream time lag, whether a degree of synchronicity between the data stream and the live event satisfies a threshold. In some examples, the degree of synchronicity may be the difference between a received timestamp and the current time, i.e., a measurement of communication latency manifested by the event stream. Determining the degree of synchronicity between the event stream 204 and the live event may also include determining a degree of synchronicity between the video stream 202 and the event stream 204. For example, if the video stream 202 and the event stream 204 are well synchronized, the method may include applying a larger threshold for communication latency of the event stream 204. However, if the video stream 202 and the event stream 204 are not well synchronized, the method may include applying a smaller threshold for communication latency of the event stream 204. If the degree of synchronicity fails to satisfy the threshold, the method continues at step 302.

If the degree of synchronicity satisfies the threshold, the method may include augmenting the video stream of the live event. At step 308, augmenting the video stream of the live event includes identifying, in the data stream, that one of the time-stamped occurrences corresponds to a wagering opportunity. In some examples, the wagering opportunity arises due to a salient occurrence in the event stream 204, such as a change of possession of a ball or puck. The method may include comparing the occurrences of the event stream 204 with predefined occurrences that trigger the wagering opportunity.

At step 310, the method includes further augmenting the augmenting the video stream of the live event by causing a user electronic device that is displaying the video stream to overlay, on the video stream, an indication of the identified occurrence that is associated with the wagering opportunity. That is, the method may include drawing the viewer's attention to the circumstances that cause the wagering opportunity.

At step 312, the method includes further augmenting the video stream 202 of the live event by causing the user electronic device to output a user-selectable prompt associated with the wagering opportunity for a limited period of time. For example, the method may include determining that the wagering opportunity will expire after a specific time interval (e.g., three seconds) from the time of the salient occurrence in the event stream 204. In some examples, the method includes displaying an indication of the remaining amount of time until the wagering opportunity expires, e.g., using a numeric countdown time and/or a representation of the sweep hand of a stop watch, or other visual indication.

At step 314, the method includes receiving a wager request via activation (e.g., clicking or otherwise selecting) the user-selectable prompt. The wager request may also include an associated monetary amount. In some examples, a default monetary amount is associated with an account of the user. In some examples, the user may establish or alter the monetary amount associated with wagers, e.g., by selecting an available option or otherwise providing input to the user electronic device.

At step 316, the method includes accepting the wager, if the wager request is received during the limited period of time, otherwise declining the wager. For example, the method may include determining whether or not the wager request was received during the specific time interval following the salient occurrence in the event stream 204. In some examples, the method includes factoring in the degree of synchronicity between the data stream and the live event. That is, the length of the wagering opportunity may be reduced by the degree of synchronicity, e.g., to avoid the wagering opportunity extending further in time due to greater communication lag in the event stream 204. In some examples, the method includes determining whether or not the wager request was received during the wagering opportunity by comparing the time from a real-time clock to the timestamp of the salient event in the event stream 204 (plus a defined time interval, such as three seconds). If the wager request is received after the wagering opportunity has expired, the method includes rejecting the offer and continuing at step 302.

At step 318, the method includes accepting the offer. Accepting the offer may include creating a record of the wagering request, including the terms of the wager (e.g., the monetary amount, the selected play and player, and so forth). In some examples, accepting the offer includes debiting the user's account by the amount of the wager. At step 320, the method includes determining whether the conditions of the accepted wager have been met. As described above, determining whether the conditions of the accepted wager have been met may include applying image recognition to frames of the video stream to detect occurrences related to the wager, such as an increase in score or a change of possession of the ball, puck, etc. In some examples, step 320 includes determining that the selected player performed the selected play before (or concurrent with) a salient occurrence of the event. Step 320 may include further analyzing the event stream 204 to determine the order of occurrence of events. In some examples, step 320 includes analyzing the video stream 202 to determine the order of occurrence of events. If the terms of the wager have been satisfied, the method may include, at step 322, crediting the user's account by the payoff amount of the wager.

In some examples, the live-streamed wagering environment 100 may be implemented as an app, e.g., downloaded and run on a mobile device, such as a phone, tablet, laptop computer, etc. or a television set or other system capable of displaying the video stream 202. The app may include a login screen for authenticating the user to an online gaming account. The authorization may include additional security measures, such as multi-factor authentication. The online gaming account may be linked with a bank or other financial account which allows transfer of funds to and from the online gaming account. The online gaming account may maintain other personal information regarding the user, including name, contact information, and the like. The online gaming account may also include various user preferences, such as a default betting amount.

After the app authenticates the user, the app may present the user with a schedule of live events to select from. After the user selects an event, the app may begin displaying the live feed 202 of the event and may also begin overlaying the video display 102 with features 104 based on an event feed 204 as described above. When the app determines that conditions for a wagering opportunity have been met, the app may prompt the user to place a wager. For example, the wagering opportunity may be triggered by a change of possession or resumption of play after the official game clock had been suspended. The app may prompt the user to place a wager with a limited period of time (e.g., three seconds) from the possession change or resumption of the clock. In some examples, the app prompts the user to bet on a specific player performing a specific play before (or contemporaneously with) a subsequent change of possession (and/or clock suspension).

In the specific example of a professional basketball game, the app may prompt the user to select from a list of offensive plays that include a dunk shot, a layup, a two-point jump shot, a three-point shot, a rebound, etc. and an associated offensive player to perform the selected play. The app may also prompt the user to select from a list of defensive plays that include a steal, a foul, a block, a rebound, etc. and an associated defensive player to perform the selected play. The app may compute odds associated with the selected combination, e.g., based on historical data for the selected player and/or play. In some examples, odds are computed in real time based on wagers made by active users. The user may place a wager by selecting a player/play combination and an associated monetary amount. Before accepting the wager, the app will determine whether the wager was placed within the time window for the wagering opportunity, e.g., before the opportunity has expired. If the app accepts the wager, the app will monitor the event feed 204 to determine whether the selected player performs the selected play before (or causing) a subsequent change of possession. If so, the app computes a payout amount based on the historical odds and adjusted for a defined portion (e.g., the "house take") to be retained by the wagering system 210. The app may apply the payout amount to the user's balance then return to monitoring the event stream 204 for subsequent wagering opportunities.

Figure 4:
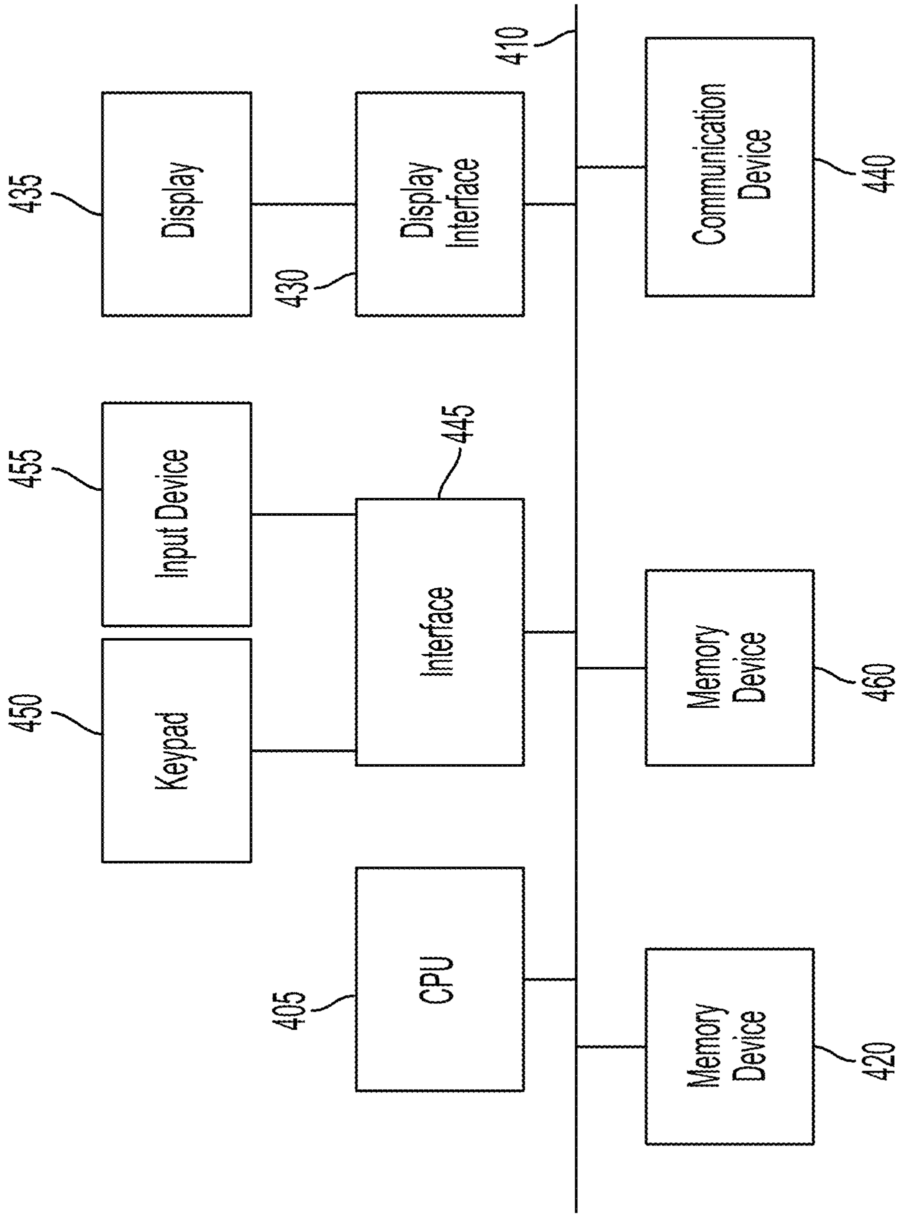
FIG. 4 shows a block diagram of an example of internal hardware that may be used to contain or implement program instructions according to an embodiment.

FIG. 4 illustrates example hardware that may be used to contain or implement program instructions. A bus 410 serves as the main information highway interconnecting the other illustrated components of the hardware. Processor 405 is a central processing device of the system, configured to perform calculations and logic operations required to execute programming instructions. As used in this document and in the claims, the terms "processor" and "processing device" may refer to a single processor 405 or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 420. Read only memory (ROM) and random-access memory (RAM) constitute examples of non-transitory computer-readable storage media 420, memory devices or data stores as such terms are used within this disclosure.

Program instructions, software or interactive modules for providing the interface and performing any querying or analysis associated with one or more data sets may be stored in the memory device 420. Optionally, the program instructions may be stored on a tangible, non-transitory computer-readable medium such as a compact disk, a digital disk, flash memory, a memory card, a universal serial bus (USB) drive, an optical disc storage medium and/or other recording medium.

An optional display interface 430 may permit information from the bus 410 to be displayed on the display 435 in audio, visual, graphic or alphanumeric format. Communication with external devices may occur using various communication ports 440. A communication port 440 may be attached to a communications network, such as the Internet or an intranet.

An optional display interface 430 may permit information from the bus 410 to be displayed on a display device 435 in visual, graphic or alphanumeric format. An audio interface and audio output (such as a speaker) also may be provided. Communication with external devices may occur using various communication devices 440 such as a wireless antenna, a radio frequency identification (RFID) tag and/or short-range or near-field communication transceiver, each of which may optionally communicatively connect with other components of the device via one or more communication system. The communication device(s) 440 may include a transmitter, transceiver, or other device that is configured to be communicatively connected to a communications network, such as the Internet, a Wi-Fi or local area network or a cellular telephone data network, or to make a direct communication connection with one or more nearby devices, such as a Bluetooth transmitter or infrared light emitter.

The hardware may also include a user interface sensor 445 that allows for receipt of data from a keyboard or keypad 450 or other input devices 455 such as, a joystick, a touchscreen, a touch pad, a remote control, a pointing device and/or microphone. Digital image frames also may be received from a camera 460 that can capture video and/or still images.

In this document, an "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

While the invention has been described with specific embodiments, other alternatives, modifications and variations will be apparent to those skilled in the art. Accordingly, it will be intended to include all such alternatives, modifications, and variations within the spirit and scope of the appended claims.

The invention claimed is:

1. A method of accepting wagers during a live-streamed event, the method comprising:

receiving, by a user electronic device, a data stream comprising a series of time-stamped occurrences related to a live event;

processing, by the user electronic device, the data stream to determine an amount of data-stream time lag between the data stream and the live event, by comparing a timestamp of an occurrence of the series of time-stamped occurrences to a local time source;

analyzing, by the user electronic device, a video stream of the live event to determine an amount of video-stream time lag;

determining, by the user electronic device, based on the amount of data-stream time lag and the amount of video-stream time lag, whether a degree of synchronicity between the data stream and the live event satisfies a threshold;

in response to the degree of synchronicity satisfying the threshold, augmenting the video stream of the live event by:

identifying, by the user electronic device, in the data stream, that one of the time-stamped occurrences corresponds to a wagering opportunity, causing the user electronic device that is displaying the video stream to overlay, on the video stream, an indication of the identified occurrence that is associated with the wagering opportunity and an indication of remaining time in a limited period of time for the wagering opportunity, and causing the user electronic device to output a user-selectable prompt associated with the wagering opportunity during the limited period of time; and in response to receiving, by the user electronic device, a wager request via a user activation of the user-selectable prompt:

if the wager request is received during the limited period of time, accepting, by the user electronic device, the wager request, otherwise declining, by the user electronic device, the wager request.

2. The method of claim 1, wherein analyzing the video stream to determine the amount of video-stream time lag comprises comparing a timestamp of the video stream to a local time source.

3. The method of claim 1, further comprising:

receiving location information associated with the received wager; and in response to the location information being outside of a geofence, declining the wager.

4. The method of claim 1, wherein identifying that one of the time-stamped occurrences corresponds to the wagering opportunity comprises identifying a change of possession from one team to another team.

5. The method of claim 1, wherein augmenting the video stream comprises overlaying names of all active players in the event.

6. The method of claim 1, wherein causing the user electronic device to output the user-selectable prompt associated with the wagering opportunity comprises overlaying controls allowing a player to establish or modify a monetary amount for a wager.

7. The method of claim 1, wherein causing the user electronic device to output the user-selectable prompt associated with the wagering opportunity comprises offering a choice of wagers, each wager comprising a defined set of conditions.

8. The method of claim 1, wherein causing the user electronic device to output the user-selectable prompt associated with the wagering opportunity comprises outputting a prompt to wager that a specific player will subsequently perform a particular play causing a score of the event to change.

9. The method of claim 1, wherein determining whether conditions of the wager have been satisfied comprises analyzing the video stream to determine whether conditions of the wager have been satisfied.

10. The method of claim 9, wherein analyzing the video stream comprises applying image recognition to the video stream to identify at least one condition of the wager.

11. The method of claim 1, further comprising, after accepting the wager request:

determining, by the user electronic device, whether conditions of the wager have been satisfied; and in response to conditions of the wager being satisfied, crediting, by the user electronic device, the user with a payoff amount for the wager.

12. A system for accepting wagers during a live-streamed event, the system comprising:

one or more processors; and a computer-readable memory containing programming instructions that are configured to, when executed, cause the one or more processors to:

receive a data stream comprising a series of time-stamped occurrences related to a live event;

process the data stream to determine an amount of data-stream time lag between the data stream and the live event, by comparing a timestamp of an occurrence of the series of time-stamped occurrences to a local time source;

analyze a video stream of the live event to determine an amount of video-stream time lag;

determine, based on the amount of data-stream time lag and the amount of video-stream time lag, whether a degree of synchronicity between the data stream and the live event satisfies a threshold;

in response to the degree of synchronicity satisfying the threshold, augment the video stream of the live event by:

identifying, in the data stream, that one of the time-stamped occurrences corresponds to a wagering opportunity, causing a user electronic device that is displaying the video stream to overlay, on the video stream, an indication of the identified occurrence that is associated with the wagering opportunity and an indication of remaining time in a limited period of time for the wagering opportunity, and causing the user electronic device to output a user-selectable prompt associated with the wagering opportunity during the limited period of time; and in response to receiving a wager request via a user activation of the user-selectable prompt;

if the wager request is received during the limited period of time, accept the wager request, otherwise decline the wager request;

determine whether conditions of the wager have been satisfied and;

in response to conditions of the wager being satisfied, crediting the user with a payoff amount for the wager.

13. The system of claim 12, wherein the programming instructions are configured to cause the one or more processors to, after accepting the wager, determine whether conditions of the wager have been satisfied by analyzing the video stream.

14. The system of claim 13, wherein the programming instructions that are configured to cause the one or more processors to analyze the video stream to determine whether conditions of the wager have been satisfied comprise programming instructions that are configured to apply image recognition to the video stream to identify at least one condition of the wager.

15. The system of claim 12, wherein the programming instructions are further configured to cause the one or more processors to, after accepting the wager:

determine whether conditions of the wager have been satisfied and;

in response to conditions of the wager being satisfied, crediting the user with a payoff amount for the wager.

* * * * *